US012665894B2

(12) United States Patent
Seidenstein et al.

(10) Patent No.: US 12,665,894 B2
(45) Date of Patent: Jun. 23, 2026

(54) SYSTEMS AND METHODS FOR AUTHENTICATION BROKERING

(71) Applicant: JPMORGAN CHASE BANK, N.A., New York, NY (US)

(72) Inventors: Richard Seidenstein, New York, NY (US); Kanishka Hettiarachchi, Chatham, NJ (US); Ish K Ahluwalia, East Brunswick, NJ (US); Darshak Kothari, Freehold, NJ (US); Vimal Gangaraju, McKinney, TX (US); Lakshmiprasanna Ummaneni, Bengaluru (IN); Karabi Sarma, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 191 days.

(21) Appl. No.: 18/458,086

(22) Filed: Aug. 29, 2023

(65) Prior Publication Data

US 2025/0023858 A1     Jan. 16, 2025

(30) Foreign Application Priority Data

Jul. 11, 2023     (IN) .............................. 202311046697

(51) Int. Cl.
*H04L 9/40* (2022.01)
*G06F 8/77* (2018.01)

(52) U.S. Cl.
CPC ...... *H04L 63/0807* (2013.01); *H04L 63/0884* (2013.01); *G06F 8/77* (2013.01)

(58) Field of Classification Search
CPC .... H04L 63/0807; H04L 63/0884; G06F 8/77
See application file for complete search history.

(56) References Cited

U.S. PATENT DOCUMENTS

| | | | | | |
|---|---|---|---|---|---|
| 5,684,950 | A | * | 11/1997 | Dare ....................... | G06F 21/41 726/10 |
| 10,454,899 | B1 | * | 10/2019 | Gabrielson ........... | H04L 9/3263 |
| 2004/0098615 | A1 | * | 5/2004 | Mowers .................. | H04L 63/10 726/8 |
| 2009/0259757 | A1 | * | 10/2009 | Ben-Shachar ...... | H04L 63/0807 709/228 |
| 2014/0059653 | A1 | * | 2/2014 | Chander ............... | H04L 63/083 726/4 |
| 2014/0331297 | A1 | * | 11/2014 | Innes .................. | H04L 63/0823 726/7 |
| 2016/0277400 | A1 | * | 9/2016 | Maurya ................... | H04L 63/18 |

* cited by examiner

*Primary Examiner* — Amie C. Lin
(74) *Attorney, Agent, or Firm* — GREENBERG TRAURIG LLP

(57) ABSTRACT

In some aspects, the techniques described herein relate to a method including: sending, by a token software development kit and to a credential broker, a request, wherein the request includes a unique identifier of a client application; receiving, at the token software development kit and from the credential broker; a response, wherein the response includes a service ticket; instantiating a token object in a memory space of the client application, wherein the token object includes the service ticket as a first attribute of the token object; instantiating a context object in the memory space of the client application, wherein the context object includes the token object as an attribute of the context object; providing the context object to the client application; and authenticating, by the client application to a service, using the context object.

7 Claims, 6 Drawing Sheets

100

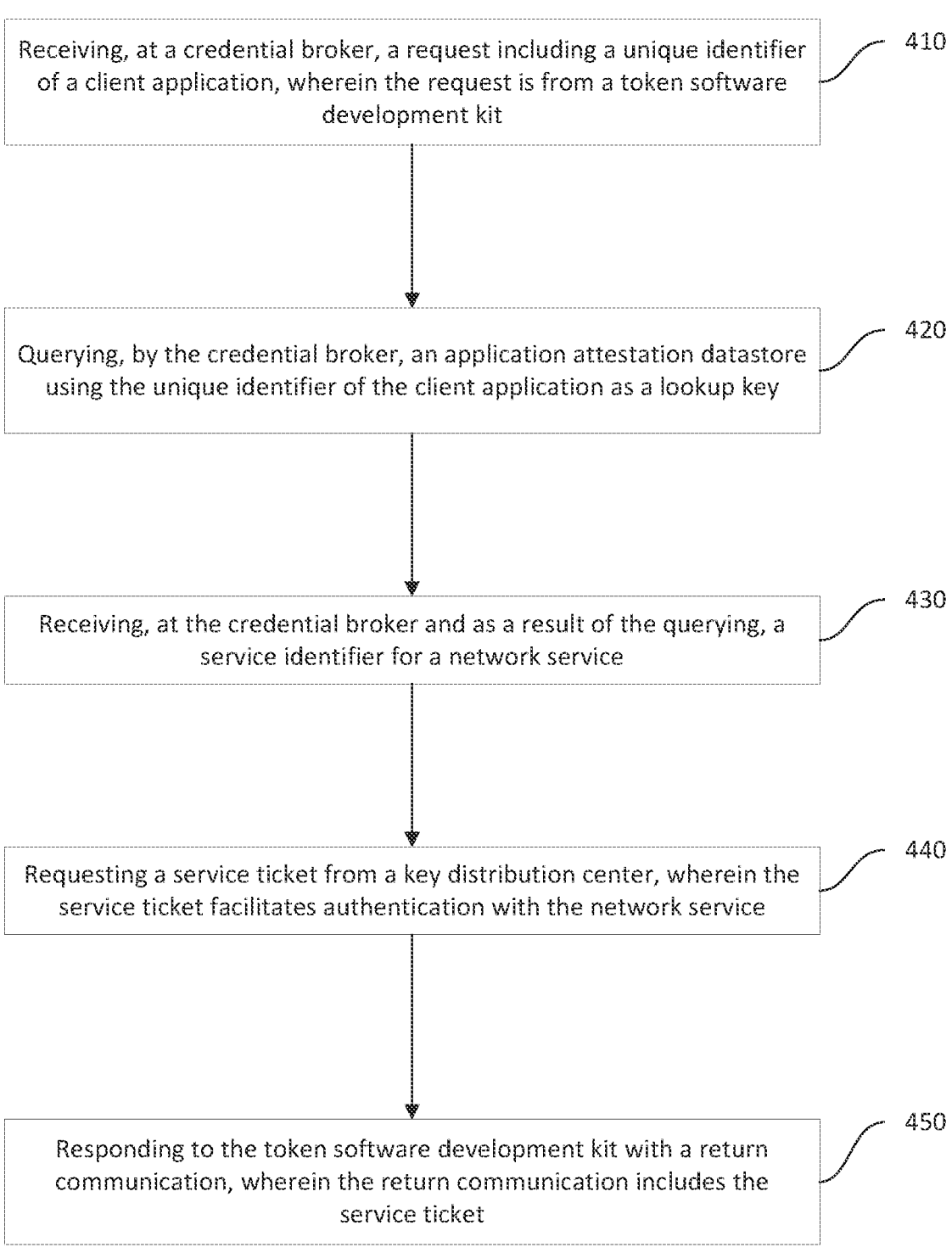

Receiving, at a credential broker, a request including a unique identifier of a client application, wherein the request is from a token software development kit                                                      410

Querying, by the credential broker, an application attestation datastore using the unique identifier of the client application as a lookup key                                                      420

Receiving, at the credential broker and as a result of the querying, a service identifier for a network service                                                      430

Requesting a service ticket from a key distribution center, wherein the service ticket facilitates authentication with the network service                                                      440

Responding to the token software development kit with a return communication, wherein the return communication includes the service ticket                                                      450

FIGURE 4

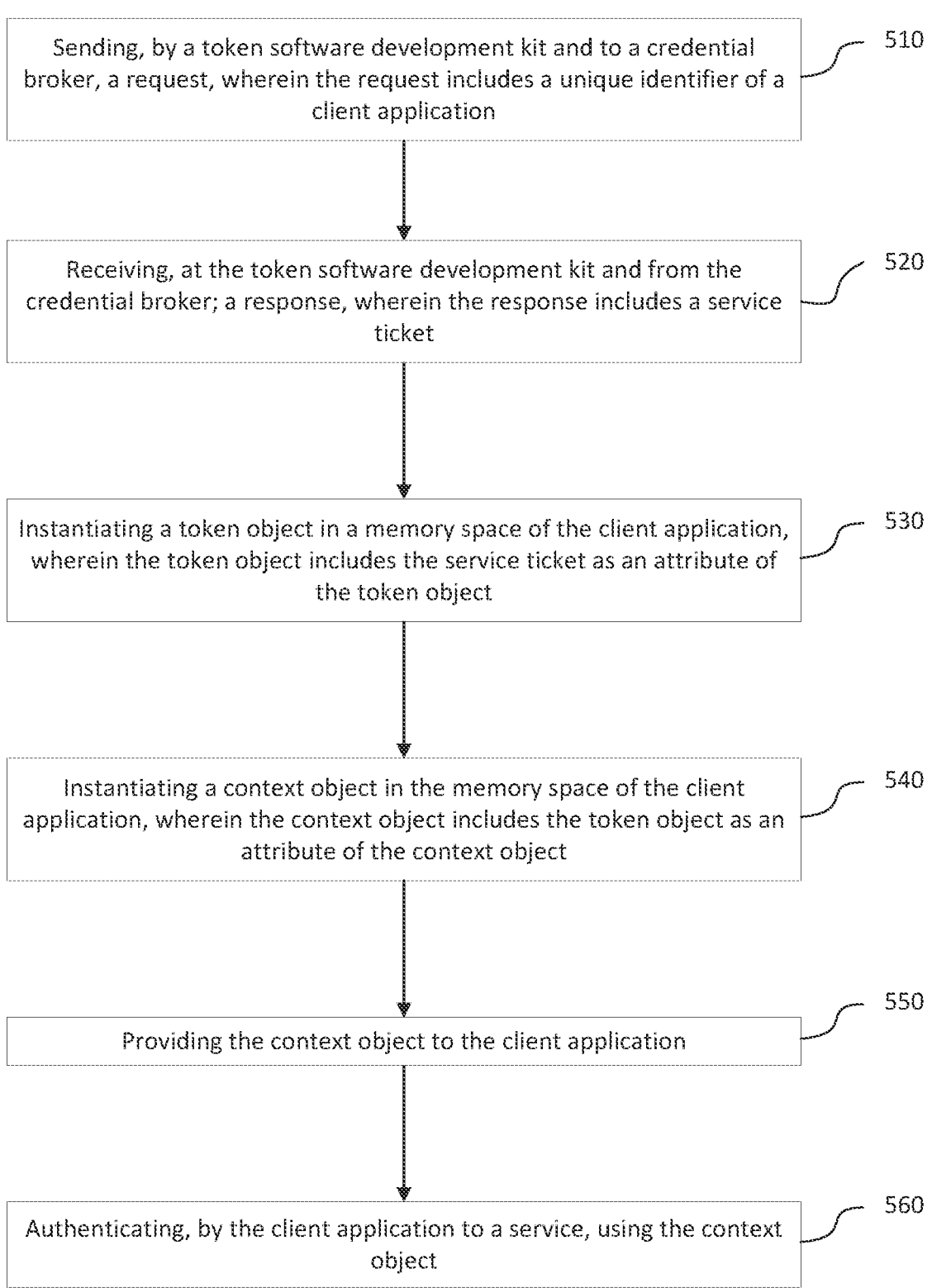

Sending, by a token software development kit and to a credential broker, a request, wherein the request includes a unique identifier of a client application — 510

Receiving, at the token software development kit and from the credential broker; a response, wherein the response includes a service ticket — 520

Instantiating a token object in a memory space of the client application, wherein the token object includes the service ticket as an attribute of the token object — 530

Instantiating a context object in the memory space of the client application, wherein the context object includes the token object as an attribute of the context object — 540

Providing the context object to the client application — 550

Authenticating, by the client application to a service, using the context object — 560

FIGURE 5

SYSTEMS AND METHODS FOR AUTHENTICATION BROKERING

RELATED APPLICATIONS

This application claims the benefit of Indian patent application No. 202311046697, filed Jul. 11, 2023, the disclosure of which is hereby incorporated, by reference, in its entirety.

BACKGROUND

1. Field of the Invention

Aspects generally relate to systems and methods for authentication brokering.

2. Description of the Related Art

Modern enterprise-level organizations often leverage both private and public cloud platforms and such mixed-use results in a hybrid enterprise cloud environment. In on-premises enterprise cloud environments, the Kerberos computer-network authentication protocol for providing secure authentication is highly embedded into current enterprise eco-systems and workflows. The Kerberos protocol has proven to be an effective and secure authentication method where physical hardware is provisioned, controlled, secured, monitored, etc., by the enterprise organization. In a hybrid cloud environment, however, where some hardware and security measures may not be controlled by a provisioning organization, where physical hardware may be shared across many virtual environments, and where heightened security measures may be prudent, workload and application authentication may benefit from adoption of new technologies that enhance security measures while maintaining existing core protocols, such as the Kerberos protocol, for the foreseeable future.

SUMMARY

In some aspects, the techniques described herein relate to a method including: receiving, at a credential broker, a request including a unique identifier of a client application, wherein the request is from a token software development kit; querying, by the credential broker, an application attestation datastore using the unique identifier of the client application as a lookup key; receiving, at the credential broker and as a result of the querying, a service identifier for a network service; requesting a service ticket from a key distribution center, wherein the service ticket facilitates authentication with the network service; and responding to the token software development kit with a return communication, wherein the return communication includes the service ticket.

In some aspects, the techniques described herein relate to a method, wherein the service ticket is Kerberos service ticket.

In some aspects, the techniques described herein relate to a method, wherein the key distribution center includes a ticket granting service.

In some aspects, the techniques described herein relate to a method, wherein the service ticket is provided by the ticket granting service.

In some aspects, the techniques described herein relate to a method, including: returning, by the key distribution center, a payload to the credential broker.

In some aspects, the techniques described herein relate to a method, including: paring, by the credential broker, data from the payload resulting in pared data.

In some aspects, the techniques described herein relate to a method, wherein the pared data includes the service ticket.

In some aspects, the techniques described herein relate to a method, including: generating, by the credential broker, a binary representation of the service ticket.

In some aspects, the techniques described herein relate to a method, wherein the binary representation of the service ticket includes a byte array.

In some aspects, the techniques described herein relate to a method, wherein the unique identifier is a workload identifier.

In some aspects, the techniques described herein relate to a method, wherein the workload identifier includes a plurality of identifying components.

In some aspects, the techniques described herein relate to a method, including: receiving, at a service registration processor, the service identifier.

In some aspects, the techniques described herein relate to a method, including: persisting, by the service registration processor, the service identifier in the application attestation datastore.

In some aspects, the techniques described herein relate to a method including: sending, by a token software development kit and to a credential broker, a request, wherein the request includes a unique identifier of a client application; receiving, at the token software development kit and from the credential broker; a response, wherein the response includes a service ticket; instantiating a token object in a memory space of the client application, wherein the token object includes the service ticket as a first attribute of the token object; instantiating a context object in the memory space of the client application, wherein the context object includes the token object as an attribute of the context object; providing the context object to the client application; and authenticating, by the client application to a service, using the context object.

In some aspects, the techniques described herein relate to a method, wherein the service ticket is a binary representation of the service ticket received from the credential broker.

In some aspects, the techniques described herein relate to a method, wherein the binary representation is a bit array.

In some aspects, the techniques described herein relate to a method, wherein the service ticket is instantiated as an object in the memory space of the client application.

In some aspects, the techniques described herein relate to a method, including: instantiating a user principal object in the memory space of the client application, wherein the token object includes the user principal object as a second attribute of the token object.

In some aspects, the techniques described herein relate to a method, wherein the token software development kit includes a Token class, a ServiceTicket class, and a User-Principal class, and the ServiceTicket class and the User-Principal class are component classes of the Token class.

In some aspects, the techniques described herein relate to a method, wherein the service ticket is instantiated as an object of the ServiceTicket class, the user principal object is instantiated as an object of the UserPrincipal class, and the token object is instantiated as an object of the Token class.

BRIEF DESCRIPTION OF THE DRAWINGS

FIG. 4 is a logical flow for authentication brokering, in accordance with aspects.

FIG. 5 is a logical flow for authentication brokering, in accordance with aspects.

DETAILED DESCRIPTION

Figure 1:
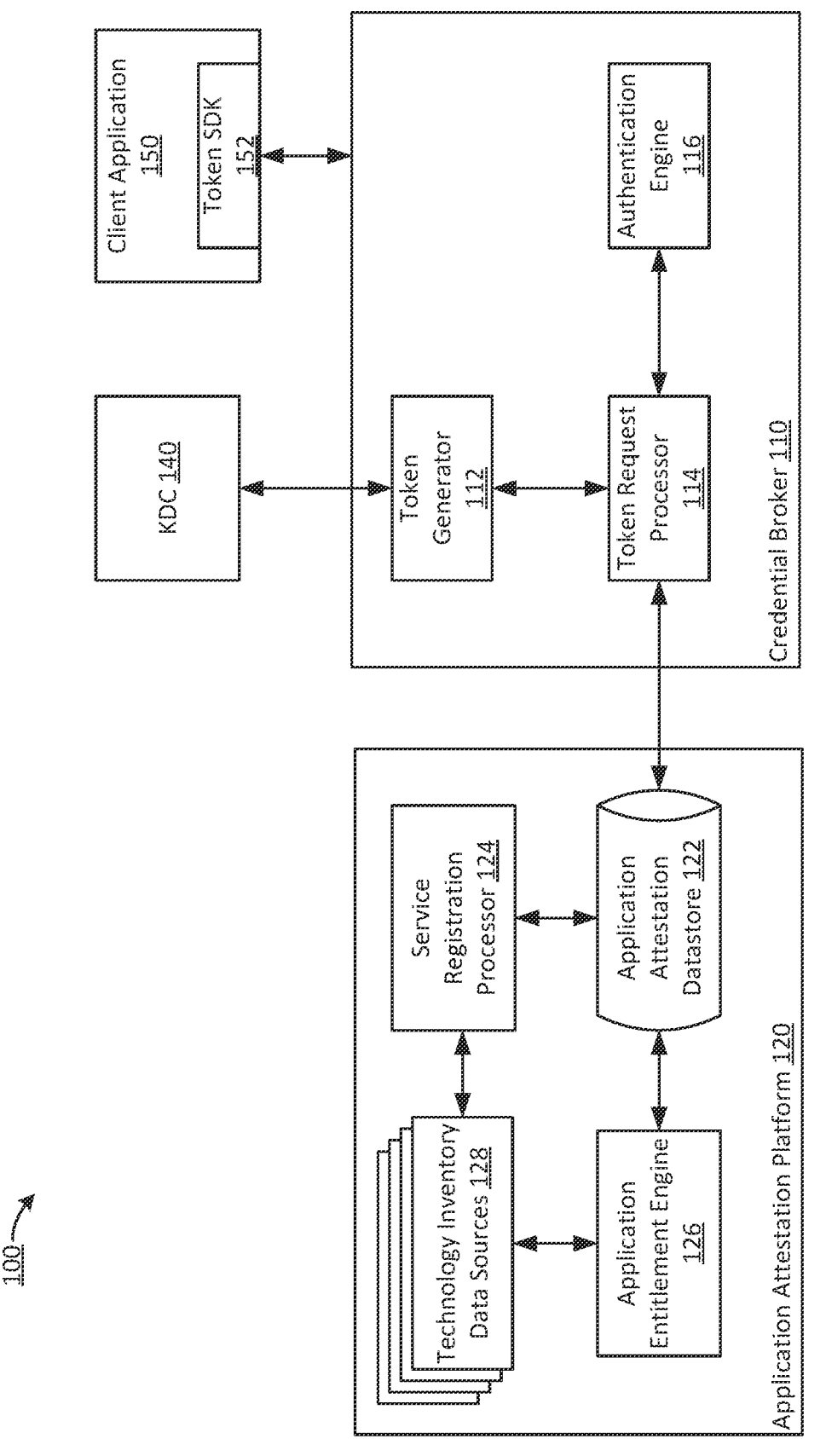
FIG. 1 is a block diagram of a system for authentication brokering, in accordance with aspects.

Aspects generally relate to systems and methods for authentication brokering.

Aspects include a novel Kerberos architecture and authentication techniques that heighten security, provide ease of use, and facilitate in-depth principles to remove common threat vectors and improve overall enterprise security in a modern distributed technology infrastructure. Aspects may provide features such as: a reduction in open firewall ports and direct connectivity to internal or on-premises resources that an organization must maintain; uniformity and ease of use across various software applications executing on varying workload types/platforms (e.g., application container platforms, distributed node machine schemes, etc.); the ability to map communications between collaborating resources to streamline or allow authentication flows only where needed; a reduced credential footprint on workload storage; authentication using in-memory credentials; password-less or no-known password-based authentication; and a superior developer experience where developers may maintain significantly less knowledge of authentication protocols and may incorporate usage of standardized libraries.

The Kerberos authentication protocol (also referred to herein as "Kerberos") is a computer network-based authentication protocol. Conventionally, both Kerberos clients and Kerberos services require a direct communication channel to a key distribution center (KDC). Accordingly, in cross-platform or hybrid scenarios (such as use of both on-premises and third-party cloud environments by an organization) Kerberos requires a significant amount of firewall ports on a hosting organization's firewall to be opened. Further, in conventional configurations, Kerberos credentials are delivered across a technology infrastructure in a credential file format and the credential file is stored on a local storage medium of hardware or on other operating system or compute-specific persistent storage. Standard Kerberos libraries and implementations also require availability of a ticket-granting ticket (TGT) and a ticket granting service (TGS). A ticket refers to a set of credentials that a KDC issues (i.e., via a TGS and that may be stored in a credential file, as noted above).

A TGT is a first ticket that is issued by a KDC to a client. A TGT allows a client to obtain additional Kerberos tickets within a granting Kerberos administrative domain (also referred to as a Kerberos realm). An exemplary domain is an Active Directory® domain. A Kerberos client (which may be a human user, an application, or a service such as a background service executing on, e.g., an instance of an operating system) may request a TGT from a KDC. A KDC may generate a TGT for the requesting client and may encrypt the generated TGT using a password provided for the client as an encryption key. When the client receives the encrypted TGT, it attempts to decrypt the TGT using its password as the decryption key. If the TGT is successfully decrypted using the password (i.e., if the client's password matches the password used to encrypt the TGT), then the decrypted TGT serves as verification of the client's identity and as authorization to request service tickets. A TGT may be timestamped and may expire at a given time after it is issued. After expiration, a new TGT must be acquired for continued authentication. A client that holds a decrypted (i.e., verified) TGT can use the TGT to request service tickets.

A service ticket is issued by a TGS. A service ticket allows a client to authenticate to and communicate with a service. A service may be hosted on a different compute node (i.e., a physical server, virtual operating system, application container, etc.). A service that relies on Kerberos for authentication must be registered with a TGS. A client of a registered service provides its TGT to a TGS and requests access to the registered service. A TGS verifies that the provided TGT is valid. If a client's TGT is determined to be valid, the TGS then issues a service ticket for the requested service to the client. The service ticket may then be used by the client to authenticate itself to the registered service that the service ticket was granted for. That is, a client may send a service ticket to a service and the service may issue or respond to service requests based on the service ticket. In this manner, only verified and authenticated clients may communicate with and make service requests to a network service.

In accordance with aspects, a credential broker that interfaces with a client and a KDC may be provided. A credential broker may be configured to interface with a provided token software development kit (SDK) that may be integrated into client applications. A credential broker may be configured to interact with a KDC as a Kerberos client and request a TGT. After receipt of a TGT, a credential broker may then request a service ticket on behalf of a client application and send the service ticket to the requesting client. A credential broker may further be configured for operative communication with an application attestation platform. A credential broker may query an application attestation datastore for a list of services that a client application is authorized to make service requests to. In this way, a credential broker may constrain service tickets it requests on a client application's behalf to those services that are identified from a query of an application attestation datastore.

In accordance with aspects, upon receipt of a requested service ticket by a requesting client, a token SDK integrated in a requesting client application may generate a token based on the received service ticket and other parameters received from a credential broker. A token SDK may include an installable software package that may provide on-device libraries including exposed functions that developers of client applications may use in order to configure a client application for communication with a credential broker. For instance, an organization may require its software developers to install a token SDK for use with all applications that will use, e.g., the Kerberos authentication protocol for network-based authentication. Libraries installed with a token SDK may allow application developers to configure Kerberos authentication for an application without in-depth knowledge of the Kerberos protocol. For instance, an application developer may only need to provide a network location (e.g., a uniform resource locator) of a credential broker when installing or configuring a token SDK to enable operative communication between a client application and the credential broker.

A token SDK may integrate with a client application and communicate with a credential broker and may request, from a credential broker, a service ticket on behalf of a client application. A token SDK may receive a requested service ticket from a credential broker and a token may be instantiated as an object in a volatile memory of a host computer that hosts/executes the client application. That is, a token SDK may include a token class that defines a token object. A token object may be instantiated in volatile memory in an application's own memory space and may be managed by a token SDK. For instance, a token may be renewed as needed and may be removed from memory when the application closes, thereby negating the need for persistent storage of a credential file on non-volatile storage allocated to a compute node.

In accordance with aspects, a token object may be provided on an as-needed basis. For instance, a token may be instantiated and maintained only in a client application's runtime environment. The token may be deleted from memory upon a client application's close. For example, a memory management procedure (such as a "garbage collection" procedure) of a host operating system (OS) may delete a token object from a memory when an application is closed. In other aspects, a token SDK may be configured to explicitly or directly delete a token object from memory. Further, a token SDK may be configured to request a new service ticket from a credential broker before expiration of a previously received service ticket (i.e., before a previously received ticket expires).

As noted above, a credential broker working in conjunction with a token SDK may offer substantial security benefits particularly (but not exclusively) in a hybrid cloud environment where ticket requests may traverse an organization's firewall. One such benefit is a reduction in firewall ports that must be open for authentication communication. This is because an SDK may be configured for operative communication with a credential broker using, e.g., a representational state transfer (REST) application programing interface (API) over HTTP communication ports such as 80 or 443. A credential broker may be configured as a web service hosted by a web server that responds to REST API calls in an HTTP request. As will be readily understood by those having skill in the relevant art, limiting opened ports on a firewall is widely recognized as a security best practice.

Moreover, by instantiating and managing a token object in a client application's memory space, no credential footprint is persisted on persistent storage allocated to an OS, an associated file system, etc. The absence of persisted credentials (such as a service ticket) diminishes a malicious actor's ability to obtain control of such credentials. Additionally, due to simplified communication between a client application using a token SDK and a credential broker, a conventional Kerberos configuration file (such as a Krb5.conf file) is not necessary. A conventional Kerberos configuration file includes sensitive information such as realm names, what encryption schemes are in use, internet protocol (IP) addresses of servers providing Kerberos services, firewall ports that services communicate on, etc. This information is conventionally persisted locally on a host, thereby creating a security risk should it be compromised. In contrast, a token SDK only requires the location (e.g., a uniform resource locator (URL)) of a credential broker in order to maintain operative communication on behalf of a client application.

FIG. 1 is a block diagram of a system for authentication brokering, in accordance with aspects. System 100 includes credential broker 110, application attestation platform 120, key distribution center (KDC) 140, and client application 150. Client application 150 includes token SDK 152. Credential broker 110 includes token generator 112, token request processor 114, and authentication engine 116. Although shown as separate components, in some aspects, token request processor 114 may include token generator 112 and authentication engine 116 as sub components or extensions of services or processes provided by token request processor 114. Application attestation platform 120 incudes application attestation datastore 122, service registration processor 124, application entitlement engine 126, and technology inventory data sources 128.

The components of FIG. 1 may be implemented on a providing organization's backend technology infrastructure. A backend technology infrastructure may span on premises and third-party infrastructures (such as "cloud" infrastructures), and may include servers, computers, software applications, computer network mediums, and computer networking hardware and software for providing electronic services based on computer software applications executing on requisite hardware. Exemplary hardware and software include webservers, application servers, database servers and database engines, communication servers such as email servers and SMS servers, client hardware, network routers, switches and firewalls, custom-developed software applications (i.e., computer client applications) including hardware to execute such applications on, etc. Requisite hardware for components of system 100 may be virtually allocated via virtual OS environments, application containers, or any other suitable method for hardware environment virtualization.

In accordance with aspects, client application 150 may execute on requisite hardware within a providing organization's technology backend, which may provide a runtime environment and may allocate memory, such as volatile random access memory (RAM) for instantiation of associated software objects. Client application 150 may include, and may be configured to use, token SDK 152 to facilitate operative communication with credential broker 110. Client application 150 may send a request for authentication, including a request for one or more service tickets, to token SDK 152. Token SDK 152 may format and forward the request to credential broker 110 via authentication engine 116. The request may be sent, e.g., over the HTTP protocol and via an API method call of an exposed method of credential broker 110 and/or authentication engine 116. An exemplary request may include (e.g., as one or more parameters/arguments of an API method) a workload identity associated with client application 150 and a ticket request for one or more services tickets.

In accordance with aspects, a workload identity may include an identity that is assigned to a software workload, such as client application 150. A workload identity may be used by authentication engine 116 to authenticate client application 150. A workload identity may include one or more identifying features of a client application. Exemplary features of a workload may include an organizational application identifier, an application deployment identifier, a related execution environment, an environment role, application metadata, an account name, etc. Some aspects may utilize a single identifying feature to authenticate a client application, while other aspects may form a workload identity as a unique combination of two or more identifying features of a client application. A workload identity or part of a workload identity may act as a unique identifier of a client application in the processes described herein.

In accordance with aspects, once client application 150 has been authenticated, the ticket request and associated parameters may be passed to token request processor 114 for further processing. Token request processor 114 may query application attestation datastore 122 of application attestation platform 120 for a list of services that client application 150 is authorized to make service requests to. Application attestation datastore 122 may be any suitable datastore (e.g., a relational database, a key-value store, a data lake, etc.). A query of application attestation datastore 122 may include a unique identifier of client application 150 as a lookup key. In some aspects, an explicit ticket request may not be received by Token request processor 114. Rather, authentication engine 116 may pass a unique identifier of client application 150 to token request processor 114 and token request processor 114 may perform a query as described above to determine what services client application 150 is authorized to make service requests to. Service tickets may then be generated based on the query response.

In accordance with aspects, application attestation datastore 122 may store a unique identifier of client application 150 as, e.g., a key, a primary key, etc., to which one or more services are related. Services related to the unique identifier may represent services for which client application 150 is authorized to make service requests to. A query of application attestation datastore 122 may return one or more service identifiers that represent a service that client application 150 is authorized to make service requests to, based on the unique identifier associated with client application 150 and included as a lookup key in the query. A service identifier may be, or may include, a Kerberos service principal name (SPN). In other aspects, a service identifier may be some other unique identifier.

In accordance with aspects, application attestation datastore 122 may be populated with service identifiers. A service identifier may be a unique identifier of a service provided for consumption (e.g., by client applications such as client application 150) on a technology infrastructure of a providing organization. Technology inventory data sources 128 may include any suitable data source from where a service identifier may be collected. Exemplary data sources that may be included in technology inventory data sources 128 may be application management systems, enterprise service registries, technology inventory systems or data sources, and other suitable enterprise data sources. In an exemplary aspect, application attestation datastore 122 may include a table or other storage format that includes service identifiers of services provided by an organization and collected from technology inventory data sources 128.

A service identifier may be extracted in various manners from technology inventory data sources 128. Service registration processor 124 may provide interfaces for persisting services provided by an organization in application attestation datastore 122. Services and corresponding service identifiers may be registered/persisted manually, e.g., during a service registration process and/or via a graphical user interface. In other aspects, services may be collected programmatically via rules-based algorithms that identify and persist service identifiers of provided services in application attestation datastore 122.

In accordance with aspects, application entitlement engine 126 may receive, retrieve, and/or generate service attestations and may reflect the service attestations in application attestation datastore 122. A service attestation is an indication that a client application has a service dependency on a provided service, and/or is authorized to make service requests to a provided service. A service attestation may be captured in an application attestation datastore such as application attestation datastore 122 as a relationship that associates a unique identifier of a client application with a service identifier of a provided service.

In accordance with aspects, a service attestation may be received at application entitlement engine 126 via an interface of application entitlement engine 126. For instance, a graphical user interface (GUI) may facilitate end-user input to 126. That is, an end-user (e.g., a human user) may manually provide a service attestation that relates a client application to a provided service. Application entitlement engine 126 may, upon receiving the service attestation, create and persist the relationship that the received service attestation reflects in application attestation datastore 122. For instance, a relationship may be created in application attestation datastore 122 that links or associates a service identifier associated with an indicated service with a client application identifier associated with an indicated client application.

In some aspects, application entitlement engine 126 may retrieve service attestations using algorithmic or rule-based procedures. For instance, application entitlement engine 126 may be programmatically configured to iterate through sources included in technology inventory data sources 128 to determine service attestations. A service attestation may be included in structured or unstructured data points included in technology inventory data sources 128. Application entitlement engine 126 may algorithmically parse, query, etc., data structures in technology inventory data sources 128 to determine service attestations and then create relationships in application attestation datastore 122 as noted, above.

In still other aspects, application entitlement engine 126 may include generative machine learning (ML) models that may take data sources included in technology inventory data sources 128 as input and may be trained to predict service attestations. For instance, data sources included in technology inventory data sources 128 may be pre-processed and persisted in, e.g., a data lake, and may be exposed to a ML model included in application entitlement engine 126 as input to the ML model. The ML model may be a generative ML model that predicts/builds dependencies of client applications on provided services. The ML model may build and/or update a knowledge graph (e.g., a graph datastore) by predicting and generating graph edges between graph nodes in a graph. A graph node may reflect a provided service or a client application. A graph edge (i.e., a connection or link between nodes) may represent a dependency of a client application on a provided service. Application entitlement engine 126 may generate output in the form of graph edges that represent a service attestation. A represented service attestation in a graph may then be captured in application attestation datastore 122 as described above.

In accordance with aspects, a query of application attestation datastore 122 may return (e.g., to token request processor 114) a list of service identifiers associated with provided services that client application 150 is authorized to make service requests to. Token request processor 114 may send the list of service identifiers to token generator 112. Token generator 112 may receive the list of service identifiers and may initiate a process for requesting corresponding service tickets for each received service identifier on behalf of client application 150. Token generator 112 may have unrestricted access to request any available service ticket from key distribution center 140.

In accordance with aspects, token generator 112 may request a TGT from key distribution center 140 if necessary. For instance, if token generator 112 does not have a valid TGT, token generator 112 may request a TGT from key distribution center 140 using a password as described herein. Once the TGT is received, token generator 112 may request service tickets using the decrypted TGT. Accordingly, token generator 112 may request a service ticket for each service identifier that is received from token request processor 114.

In accordance with aspects, token generator 112 may pare service ticket data received from key distribution center 140, where the pared data is not required for authentication and communication by token SDK 152. A conventional payload from a KDC will include both a TGT and requested service tickets along with other data. Token SDK 152, however, does not require a TGT and much of the additional data received from key distribution center 140. Accordingly, token generator 112 may pare the amount of information down to only service ticket data associated with/included in the requested service tickets. Token generator 112 may then convert the pared service ticket data (i.e., the requested service tickets) to a binary representation of the service tickets (e.g., to a byte array) and send the service ticket, in a return response, to token SDK 152. The return response may be a return response to an API call (e.g., a method call) by token SDK 152. The call made by token SDK 152 may be a synchronous call, where token SDK 152 waits for a response. In some aspects, token generator 112 may pass the service tickets to token request processor 114 or authentication engine 116 or other components of credential broker 110 to format and send the return response.

In accordance with aspects, token SDK 152 may receive parameters from credential broker 110 and may instantiate a token object (e.g., a Kerberos token object) in memory. That is, token SDK 152 may receive the binary representation of the service ticket(s) received from credential broker 110 and use the received service tickets to instantiate a service-ticket object which is an in-memory representation of a service ticket. For instance, token SDK 152 may pass a received byte array that is a binary representation of one or more service tickets to a constructor of a service ticket class, and the class constructor may instantiate a service ticket in a memory space of client application 150.

Figure 2:
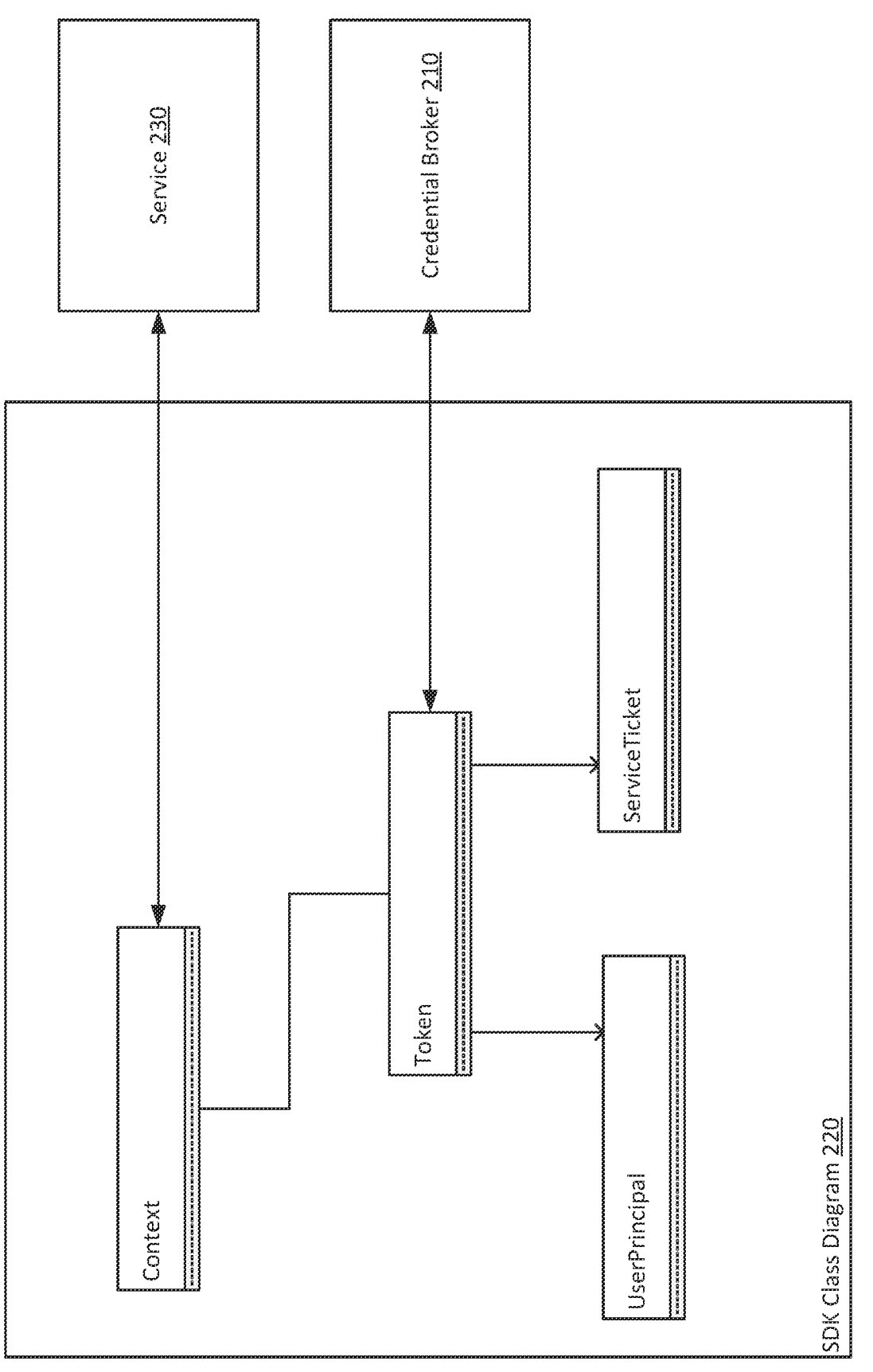
FIG. 2 is a class diagram of exemplary classes in a token software developer kit, in accordance with aspects.

FIG. 2 is a class diagram of exemplary classes in a token software developer kit, in accordance with aspects. FIG. 2 includes SDK class diagram 220. FIG. 2 additionally includes credential broker 210 and service 230. SDK class diagram 220 includes a Token class, a UserPrincipal class, a ServiceTicket class, and a Context class. The classes depicted in SDK class diagram 220 may be included in a token SKD and may be instantiated once one or more service tickets are received by a token SDK from credential broker 210.

In accordance with aspects, a ServiceTicket object may include attributes that facilitate instantiation of a service ticket (e.g., a Kerberos service ticket) in a client application's memory space. A constructor for a ServiceTicket class may take some or all of a service ticket received from service 230 as constructor arguments to instantiate a ServiceTicket object in memory. The service ticket may be received and passed to the constructor in a binary format. A UserPrincipal constructor may take the name of an authenticated Kerberos principal (e.g. user@REALM) as an argument and may instantiate a UserPrincipal object in memory. A principal may be provided by a token SDK on behalf of an associated client application. In other aspects, a user principal may be received from credential broker 210 as part of, or in addition to, one or more service tickets.

Aspects may configure a ServiceTicket class and a UserPrincipal class as composite classes of a Token class. For instance, a Token class may include instances of a UserPrincipal class and a ServiceTicket class. A composition structure may define a Token class as including one or many instances of a ServiceTicket object and having a one-to-one relationship (i.e., including a single) UserPrincipal object. A constructor of a Token object may take, e.g., a list of ServiceTicket objects and a UserPrincipal object. Accordingly, a token SDK may instantiate a Token object that maybe an in-memory representation of an authentication token that includes one or more ServiceTicket objects and a UserPrincipal object, as described above. A Token object may include other attributes, as is necessary or desired.

In accordance with aspects, a Context class may be a language-specific class that has an aggregation relationship with a Token. For instance, a Token object may be part of a Context object. Various contemporary programming languages (such as object-oriented languages) may provide an authentication context class that may act as a Context class as described herein. A Context class may set a context for an authentication protocol, such as the Kerberos protocol, for the given programming language. An exemplary Context class provided by the Java® programming language is javax.auth.security.auth.Subject. A Context class constructor may take a Token object as an argument and may instantiate a Context object in memory that may manage authentication communications between a client application and a provided service, including providing included service tickets to the relevant service (e.g., service 230).

Figure 3:
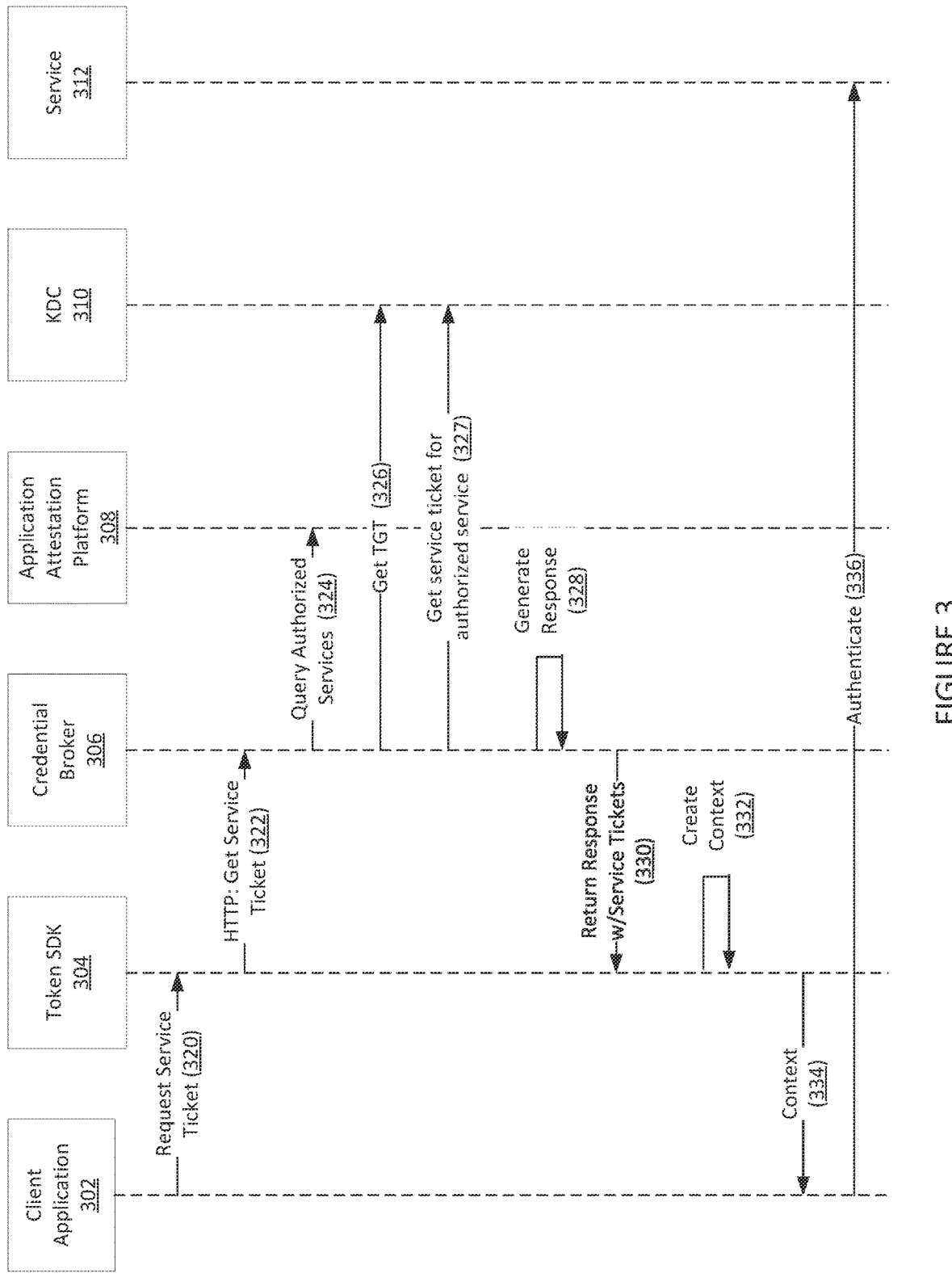
FIG. 3 is a sequence diagram for providing authentication brokering, in accordance with aspects.

FIG. 3 is a sequence diagram for providing authentication brokering, in accordance with aspects. FIG. 3 includes client application 302, token SDK 304, credential broker 306, application attestation platform 308, key distribution center (KDC) 310, and service 312. At step 320, client application 302 may request a service ticket from token SDK 304. This request may happen as client application 302 is launched (i.e., at startup) and may happen in client application 302's runtime environment. At step 322, token SDK 304 may send a request including a unique identifier of client application 302 to credential broker 306. The request may include a request for a service ticket and may be in the form of an API method call. The request may be a synchronous request and token SDK 304 may wait for a response from credential broker 306.

At step 324, credential broker 306 may use the unique identifier received at step 322 as a lookup key to query application attestation platform 308 for services that client application 302 is authorized to make service requests to. Application attestation platform 308 may return a query result including service identifiers that represent services that client application 302 is authorized to make service requests to. Granted services tickets may be constrained to only services that client application 302 is authorized to make service requests to, as indicated in application attestation platform 308.

At step 326, credential broker 306 may request a TGT (if needed) from KDC 310. The TGT request may follow steps as outlined herein. At step 327, credential broker 306 may request one or more service tickets that correspond, respectively, to one or more service tickets received in step 324 from KDC 310. KDC 310 may respond to the request with the corresponding service tickets. At step 328, credential broker 306 may format a response to the request made at step 322. The response may be a return response to a synchronous API method call made in step 322. Credential broker 306 may format a binary representation (e.g., a byte array) of the one or more service tickets received from KDC 310 and may return the formatted response at step 330.

Token SDK 304 may receive the response and, at step 332 may instantiate in-memory objects as described herein, including a Context object and the objects included therein. At step 334, token SDK 304 provides the Context object to client application 302. In some aspects, the SDK may provide a utility method that facilitates retrieval of the Context object by client application 302. At step 336, client application 302 may utilize the Context object to connect/authenticate to service 312. An exemplary Java® method for connection to a service may be javax.auth.security.auth.Subject.doAs( ).

FIG. 4 is a logical flow for authentication brokering, in accordance with aspects.

Step 410 includes receiving, at a credential broker, a request including a unique identifier of a client application, wherein the request is from a token software development kit.

Step 420 includes querying, by the credential broker, an application attestation datastore using the unique identifier of the client application as a lookup key.

Step 430 includes receiving, at the credential broker and as a result of the querying, a service identifier for a network service.

Step 440 includes requesting a service ticket from a key distribution center, wherein the service ticket facilitates authentication with the network service.

Step 450 includes responding to the token software development kit with a return communication, wherein the return communication includes the service ticket.

FIG. 5 is a logical flow for authentication brokering, in accordance with aspects.

Step 510 includes sending, by a token software development kit and to a credential broker, a request, wherein the request is for a service ticket and includes a unique identifier of a client application.

Step 520 includes receiving, at the token software development kit and from the credential broker; a response, wherein the response includes a service ticket.

Step 530 includes instantiating a token object in a memory space of the client application, wherein the token object includes the service ticket as an attribute.

Step 540 includes instantiating a context object in the memory space of the client application, wherein the context object includes the token object as an attribute.

Step 550 includes providing the context object to the client application.

Step 560 includes authenticating, by the client application to a service, using the context object.

Figure 6:
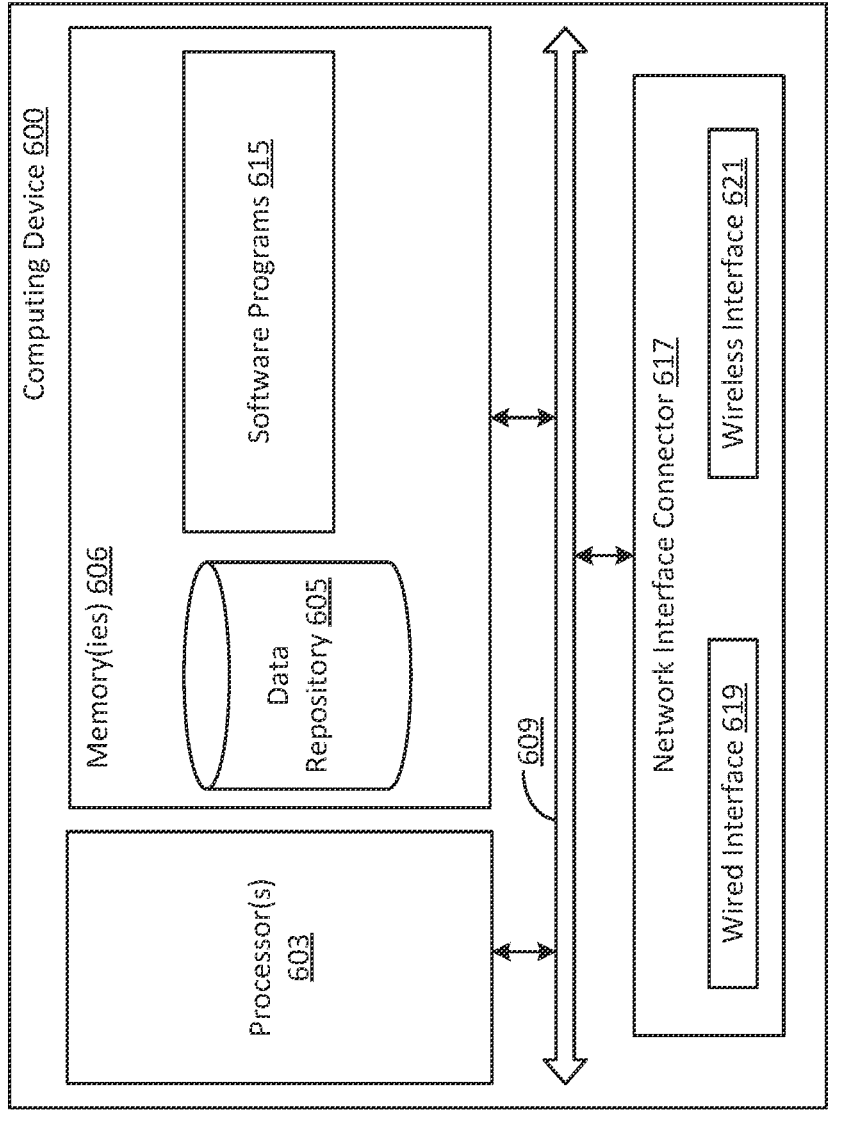
FIG. 6 is a block diagram of a computing device for implementing certain aspects of the present disclosure.

FIG. 6 is a block diagram of a computing device for implementing certain aspects of the present disclosure. FIG. 6 depicts exemplary computing device 600. Computing device 600 may represent hardware that executes the logic that drives the various system components described herein. For example, system components such as a credential broker and its components, an application attestation platform and its components, a KDC, a client application and token SDK, various database engines and database servers, and other computer applications and logic may include, and/or execute on, components and configurations like, or similar to, computing device 600.

Computing device 600 includes a processor 603 coupled to a memory 606. Memory 606 may include volatile memory and/or persistent memory. The processor 603 executes computer-executable program code stored in memory 606, such as software programs 615. Software programs 615 may include one or more of the logical steps disclosed herein as a programmatic instruction, which can be executed by processor 603. Memory 606 may also include data repository 605, which may be nonvolatile memory for data persistence. The processor 603 and the memory 606 may be coupled by a bus 609. In some examples, the bus 609 may also be coupled to one or more network interface connectors 617, such as wired network interface 619, and/or wireless network interface 621. Computing device 600 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, JavaScript, Python, and/or GO for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
sending, by a token software development kit included in a client application and to a credential broker, a request for a service ticket comprising a unique identifier for the client application, wherein the credential broker is configured to query an application attestation datastore for network services that the client application is authorized to make service requests to using the unique identifier of the client application as a lookup key, to receive, as a result of the querying and from the application attestation datastore, a service identifier for one of the network services; to receive a ticket granting ticket from a key distribution center, wherein the ticket granting ticket is encrypted and corresponds to the service identifier, to request the service ticket that facilitates authentication with a network service from the key distribution center based on the ticket granting ticket received, and to receive the service ticket from the key distribution center;
receiving, at the token software development kit and from the credential broker, a response, wherein the response comprising the service ticket;
instantiating, by the token software development kit, a token object in a memory space of the client application, wherein the token object includes the service ticket as a first attribute of the token object;
instantiating, by the token software development kit, a context object in the memory space of the client application, wherein the context object includes the token object as an attribute of the context object;
providing, by the token software development kit, the context object to the client application;
authenticating, by the client application to the network service, using the context object.

2. The method of claim 1, wherein the service ticket is a binary representation of the service ticket received from the credential broker.

3. The method of claim 2, wherein the binary representation is a bit array.

4. The method of claim 1, wherein the service ticket is instantiated as an object in the memory space of the client application.

5. The method of claim 4, comprising:
instantiating a user principal object in the memory space of the client application, wherein the token object includes the user principal object as a second attribute of the token object.

6. The method of claim 5, wherein the token software development kit comprises a Token class, a ServiceTicket class, and a UserPrincipal class, and the ServiceTicket class and the UserPrincipal class are component classes of the Token class.

7. The method of claim 6, wherein the service ticket is instantiated as an object of the ServiceTicket class, the user principal object is instantiated as an object of the UserPrincipal class, and the token object is instantiated as an object of the Token class.

* * * * *